(12) United States Patent
Vlot et al.

(10) Patent No.: US 9,729,333 B2
(45) Date of Patent: Aug. 8, 2017

(54) REVOCATION OF A ROOT CERTIFICATE STORED IN A DEVICE

(71) Applicant: Vodafone GmbH, Düsseldorf (DE)

(72) Inventors: Marnix Vlot, Düsseldorf (DE);
Christoph Schaaf, Düsseldorf (DE)

(73) Assignee: Vodafonic GmbH (DE)

( * ) Notice: Subject to any disclaimer, the term of this patent is extended or adjusted under 35 U.S.C. 154(b) by 2 days.

(21) Appl. No.: 14/735,569

(22) Filed: Jun. 10, 2015

(65) Prior Publication Data

US 2015/0365241 A1 Dec. 17, 2015

(30) Foreign Application Priority Data

Jun. 16, 2014 (EP) .................................... 14002069

(51) Int. Cl.
*H04L 29/06* (2006.01)
*H04L 9/32* (2006.01)

(52) U.S. Cl.
CPC .......... *H04L 9/3268* (2013.01); *H04L 9/3247* (2013.01)

(58) Field of Classification Search
CPC ............................ H04L 9/3268; H04L 9/3247
USPC ........................................................ 713/158
See application file for complete search history.

(56) References Cited

U.S. PATENT DOCUMENTS

| | | | | |
|---|---|---|---|---|
| 7,047,404 B1* | 5/2006 | Doonan | ................... | G06F 21/64 380/30 |
| 9,432,198 B2* | 8/2016 | Falk | ...................... | H04L 63/0823 |
| 2005/0144437 A1* | 6/2005 | Ransom | .................... | G06F 1/28 713/151 |
| 2005/0154898 A1* | 7/2005 | Chao | ...................... | G06F 21/445 713/185 |
| 2011/0167257 A1* | 7/2011 | Gossel | .................... | H04L 9/321 713/156 |
| 2012/0011360 A1* | 1/2012 | Engels | .................... | H04L 9/006 713/166 |
| 2013/0346747 A1* | 12/2013 | Ignatchenko | ......... | H04L 9/3268 713/158 |
| 2015/0256345 A1* | 9/2015 | Vaid | ...................... | H04L 9/3268 713/158 |

* cited by examiner

*Primary Examiner* — Dede Zecher
*Assistant Examiner* — Dereena Cattungal
(74) *Attorney, Agent, or Firm* — Innovation Counsel LLP (57) ABSTRACT

The invention relates to a device for validating data using a root certificate, wherein a plurality of root certificates is stored in the device, each root certificate having a rank. The device is configured to receive revocation information indicating at least one revoked root certificate, to validate the revocation information using one of the root certificates stored in the device and to block the use of the revoked root certificate if the revocation information is successfully validated using a root certificate having a higher rank than the revoked root certificate. Moreover, the invention relates to a method for revoking a root certificate stored in a device.

25 Claims, 2 Drawing Sheets

REVOCATION OF A ROOT CERTIFICATE STORED IN A DEVICE

CROSS-REFERENCE TO RELATED APPLICATIONS

This application claims benefit of priority to European Patent Application No. EP14002069 filed on Jun. 16, 2014, the entire contents of which is incorporated herein by reference

DESCRIPTION

The invention relates to the revocation of digital certificates in a device. More specifically, the invention is related to a device for validating data using a root certificate, in which the root certificate can be revoked. Moreover, the invention is related to a method for revoking a root certificate stored in a device and to a computer program for carrying out the method.

In asymmetric cryptosystems, secret keys and public keys which together form asymmetric key pairs are used for encrypting and decrypting data. The secret key of a key pair is only known to the owner of key pair and the public key is made available to other users, which may use the public key to encrypt data which can only be decrypted by the owner of the key pair using his secret key or to decrypt data provided by the owner of the key pair and encrypted using the secret key. In particular, digital signatures created by the owner of the key pair for certain data can be verified using the public key. Such digital signatures usually comprise a digest, such as a hash value, of the data. The digest is encrypted using the secret key of the key pair, and if a user wishes to verify the digital signature, he decrypts the digest using the public key. In order to verify the integrity of the data, the user calculates the digest for the data and compares the calculated digest with the decrypted digest. If both digests match, the integrity of the data is confirmed.

In many such applications, it is important for a user to be able to verify that a public key belongs to a certain entity. For this verification, digital certificates are employed, which create links between public keys and the entity owning these keys and which are provided in the user device in a secure way. In particular, a so-called root certificate may be stored in the user device in a physically secured memory. In addition to the root certificate further digital certificates may be provided in the user device which may be secured by encrypting data included therein and which may be arranged in a hierarchical tree structure in which the root certificate corresponds to the root node. Each further digital certificate in this tree structure particularly includes an encrypted digest of a public key, and this encrypted digest is created using a secret key pertaining to a digital certificate in the preceding level of the tree structure. Thus, the public key of a first digital signature in the tree structure can be used to decrypt the encrypted digest included in a second digital certificate in the next level of the tree structure in order to validate the public key pertaining to the second digital certificate.

The security of operation of the user device is compromised when a secret key pertaining to one of the digital certificates becomes known to third parties. In this case, an attacker which has come into possession of the secret key may particularly be able to provide data to the user device which are digitally signed using the secret key so that the data are successfully validated in the user device. Therefore, it is known to revoke digital certificates stored in a user device. For this purpose, so-called revocation messages may be sent to the user device, which specify digital certificates which shall no longer be used for verifying digital signatures and/or further digital certificates.

If digital certificates in a higher hierarchy level of the tree structure are revoked in such a way, it is possible for the entities which provided the revoked certificates to transmit to the device replacement certificates from a remote location. Such replacement certificates can be validated using digital certificates in a lower hierarchy level of the tree structure of digital certificates provided din the user device, when the secret keys pertaining to such digital certificates have not been uncovered to un-authorized third parties. However, it is usually not possible or requires very complicated security mechanisms to revoke a root certificate and to transmit a new root certificate to the user device from a remote location, because user devices do usually not dispose of certificates to validate a replacement root certificate.

Therefore, it is an object of the present invention to provide a mechanism for revoking a root certificate securely stored in a device such that a new root certificate can be securely taken into use within the device.

This object is achieved by a device according to claim 1, by a method according to claim 14 and by a computer program according to claim 15. Embodiments of the device, the method and the computer program are given in the dependent claims.

According to one aspect, the invention suggests a device for validating data using a root certificate. In the device, a plurality of root certificates is stored, each root certificate having a rank. Moreover, the device is configured to receive revocation information indicating at least one revoked root certificate, to validate the revocation information using one of the root certificates stored in the device and to block the use of the revoked root certificate if the revocation information is successfully validated using a root certificate having a higher rank than the revoked root certificate.

According to a further aspect, the invention suggests a method for revoking a root certificate stored in a device. In the device, a plurality of root certificates is stored, each root certificate having a rank. The method comprises the steps of: (i) receiving in the device revocation information indicating at least one revoked root certificate, (ii) validating the revocation information using one of the root certificates stored in the device and (iii) blocking the use of the revoked root certificate if the revocation information is successfully validated using a root certificate having a higher rank than the revoked certificate specified in the revocation information.

Thus, the invention advantageously allows for storing a plurality of root certificates in a device and for revoking these root certificates individually. If one of the root certificates stored in the device is revoked, a further root certificate can be used for validating data. Moreover, it is an advantage of the invention that a root certificate is only revoked in the user device (i.e. blocked for being further used for validating data) upon a successful validation of the revocation information using a root certificate that has a higher rank than the revoked root certificate. This ensures that a compromised secret key pertaining to a root certificate (which is ready to be revoked due to the leaked secret key) usually cannot be used to generate valid revocation information for all root certificates stored in the device.

The root certificates stored in the device include a least one public key. Moreover, each root certificate may include an indication of the rank of the root certificate and may optionally include further management data, such as an identification of the root certificate. In addition, the root certificates may optionally include a digital signature.

In one embodiment of the device and the method, the revocation information includes a digital signature and the validation of the revocation information comprises validating the digital signature. The digital signature may include a digest of the revocation message which is decrypted using one of the root certificates which has a higher rank than the root certificate to be revoked. The digest may include a hash value of the revocation information.

In a further embodiment of the device and the method, the device is adapted to securely store a revocation indication for the root certificate specified in the revocation information in response to a successful validation of the revocation information. In a related embodiment of the device and the method, the device is configured to check whether a revocation indication for a root certificate is stored in the device when data is to be validated using the root certificate and to validate the data using a root certificate only if no revocation indication for the root certificate is stored in the device.

In these embodiments, the revocation indication securely stored in the device ensures that a revoked root certificate can no longer be used in the device for validating data upon receipt and successful validation of revocation information pertaining to this root certificate.

In a further related embodiment, the device comprises a one-time programmable memory for storing the revocation indication. By storing the revocation indication in a one-time programmable memory, it is ensured that the revocation indication cannot be modified or erased after having been stored in the device.

Furthermore, an embodiment of the device and the method provides that the user device is configured to access and validate the revocation information each time a root certificate is to be used in the device in order to validate data. Hereby, it is ensured that a revoked root certificate cannot be further used in the device upon the provision of revocation information pertaining to this root certificate without having to securely store an additional revocation indication for that root certificate in the device.

In a related embodiment of the device and the method, the device is configured to store the revocation information upon receipt thereof and to apply the stored revocation information each time a root certificate is to be used in order to validate data. Here, applying revocation information may particularly include validating the revocation information and blocking root certificates for use, which are indicated at being revoked in the revocation information. Moreover, in one embodiment of the method and the device, the device is configured to access the revocation information by retrieving the revocation information from a trust authority server connected to the user device. Thus, the device can store and/or retrieve the revocation information in order to have the revocation information available when a root certificate is to be accessed in order to validate data.

In a further embodiment of the invention, the trust authority server provides a new version of the revocation information each time a root certificate is revoked, each version indicating all root certificates that have been revoked until an issuance of the version, and the device is configured to receive a new version of the revocation information upon issuance thereof. Thus, there are several versions of the revocation information, and each version specifies the revocation status of each root certificate stored in the device at the point of time this version of the revocation information is issued at. When one version of the revocation information is successfully validated in the device, the device preferably blocks all root certificates indicated in this version of the revocation information as being revoked for being used for validating data. A new version of the revocation information may be sent to the device on the initiative of the trust authority server, or the device may retrieve new versions from the trust authority server on its initiative.

A related embodiment of the device and the method provides that a minimum version of the revocation information is allocated to at least one program module included in the device, where the device is configured to execute an error routine, it is not verified that the applied version of the revocation list is equal to or greater than the minimum version. In accordance with the error routine, the device may particularly stop or pause the execution of the program module Hereby, it can particularly be achieved that individual minimum versions of the revocation information are specified for program modules installed in the device, where a program module is not further executed when an older version of the revocation information is used. Hereby, it is prevented that the program module is tampered with due to an out-dated version of the revocation information.

In a further embodiment of the device and the method, the root certificates are stored in the device in such way that they cannot be modified. In specific implementations of this embodiment, the root certificates may be stored in a one-time programmable memory or a read-only memory. The one-time programmable memory or the read-only memory may be programmed (i.e. the root certificates may be stored therein) at the time of manufacturing the device or in a secure process for provisioning the device.

Furthermore, one embodiment of the device and the method provides that the device comprises a secure processing environment for validating data using the root certificates stored in the device and for validating the revocation information. This embodiment ensures that the root certificates and the related revocation information can be processed in a secure manner within the user device.

In addition to the device and its embodiments, the invention further provides a system including the device or an embodiment thereof and further comprising a trust authority server connected to the device. The trust authority server is adapted to transmit the revocation information to the device. The transmission of the revocation information may be initiated on the initiative of the trust authority server. This may e.g. be done each time a root certificate is revoked by the trust authority operating the trust authority server. In further embodiments, the user device retrieves the revocation information from the trust authority server.

According to a further aspect, the invention also suggests a computer program that includes program code for executing the method according to the invention or its embodiments when the program code is executed on a processor.

The aforementioned and other aspects of the invention will also be apparent from and elucidated with reference to the embodiments described hereinafter making reference to the drawings in which.

Figure 1A:
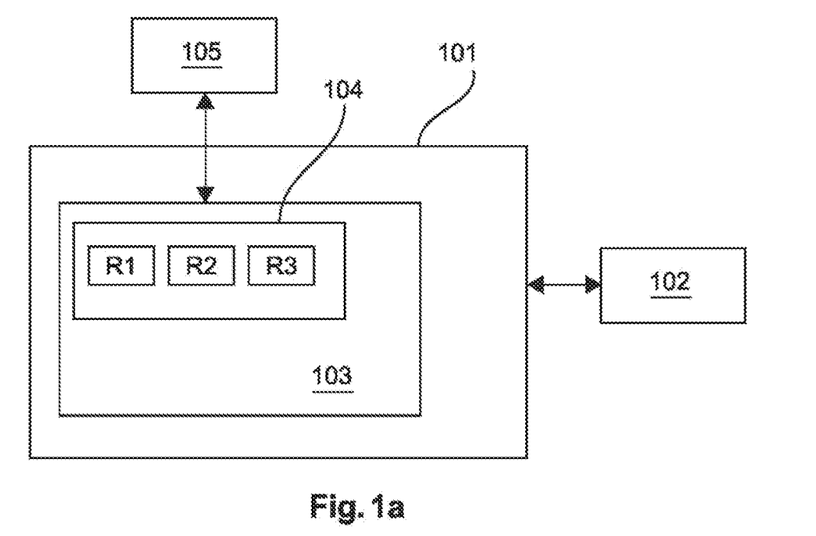
FIG. 1a is a schematic depiction of a device according to the invention in a first embodiment.
Figure 1B:
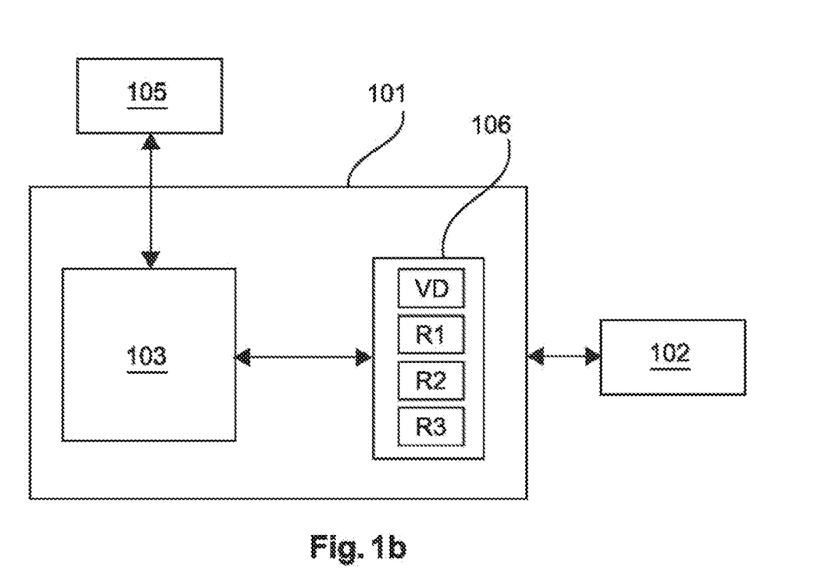
FIG. 1b is a schematic depiction of a device according to the invention in a second embodiment.

FIGS. 1a and 1b show a user device 101 which is capable of exchanging protected data with at least one data server 102 or with at least one further user device via a transmission channel. In principle, any protected data may be transmitted from the data server 102 to the user device 101. In particular, the data may comprise user data which are processed in the user device 101. Such user data may include audio-visual content (such as e.g. movies, audio pieces or text documents) and/or messages of any format (such as e.g. emails) which are rendered using the user device 101 for being perceived by its user using a user interface (not shown in the figures) included in or connected to the user device 101. Furthermore, the protected data may include control messages which control the user device 101 to execute certain functions and/or images of software programs which are installed in the user device 101 in order to be executed therein.

In one exemplary embodiment, the user device 101 is a so-called consumer premises equipment (CPE), such as a set top box or a similar device, which is adapted to receive protected audio-visual content from a content provider via a broadcast transmission channel and provide such protected content for playback. As an alternative to a broadcast of a protected content, the protected content may e.g. be transmitted to the user device 101 individually via a data network upon a corresponding request of the user device 101. The protected content may transmitted to the user device 101 in an encrypted and/or scrambled form, and the user device 101 may descramble and/or decrypt the protected content (commonly referred to as decrypting herein) so that the content can be rendered using a suitable playback device coupled to the user device 101. For decrypting the protected content, the user device 101 may particular use a so-called control word, which is provided to the user device 101 by the provider of the protected content via the same transmission channel as the protected content or via a different transmission channel.

In this embodiment, the user device 101 may be capable of decrypting content of several content providers. For this purpose, the user device 101 may comprise system software, which provides general system functions for decrypting the content, and such system functions may be used for decrypting the content of all content providers. Moreover, the user device 101 may include for each content provider a client software module, which provides provider-specific functions and which may communicate with the content provider. The client software modules assigned to the content providers control the user device to decrypt and provide the protected content of the corresponding content provider for playback and, for this purpose, the client software modules access functions provided by the systems software. For instance, a client software module may receive the control word from the associated content provider and may forward the control word to the system software so that the system software is enabled to decrypt the provider's content.

In this embodiment, the program modules included in the user device 101, including the program modules of the system software (at least those providing security-related functions) and the client software modules assigned to the content providers, are only executed in the user device 101, after their software images have been successfully validated in a validation procedure. This ensures that only certified program modules can be executed in the user device 101. In this embodiment, the protected data does particularly include the software images installed in the user device 101.

In the exchange of protected data with the user 101 device and the validation of protected data, asymmetric cryptography is applied. This involves the use of public keys which may be applied for encrypting information that is transmitted to the owner of the corresponding key pair including the public key and a secret key and, when the owner of the key pair receives the data, it can decrypt the data using the secret key. Moreover, public keys may be used for decrypting information that is received in the user device 101 and that has been encrypted using the allocated secret keys. Such decryption by means of a public key may particularly be made in order to verify that the received information originates from the entity owning the secret key. In particular, the public key of an entity may be used to decrypt a digital signature created by the entity's secret key and to verify the authenticity and integrity of data provided with the digital signature.

In order to validate the public keys used for encrypting or decrypting data, the user device 101 disposes of digital certificates allocated to the public keys used in the user device 101. Each digital certificate, which is not a root certificate, includes a public key of an entity and management information which may comprise an identification of the digital certificate and information about the entity to which the public key is assigned. Moreover, each digital certificate (except root certificates) may include a digital signature which can be verified using a further public key included in a further digital certificate. This further digital certificate is preferably also specified in the management information pertaining to a digital certificate by including the identification of the further digital certificate into the management information. Thus, there is a hierarchical tree structure of digital certificates, which allows for validating each digital certificate using a digital certificate in the preceding level of the tree structure. The digital certificates in the second level of the hierarchy (following the root node level) can be validated using a root certificate which is securely stored in the user device 101 and which forms the root node of the hierarchy.

In order to execute cryptographic processes including the encryption and decryption of data and the calculation of digests of data, such as hash values, the user device 101 preferably comprises a secure processing environment 103. The secure processing environment 103 may be a special microprocessor, such as a crypto-processor, which consists of a secured hardware and/or software for carrying out the cryptographic processes. The secured hardware and software configuration ensures that an attacker cannot tamper the cryptographic processes and read secure cryptographic information from the secure processing environment 103. The secure processing environment 103 may communicate with further hardware and/or software of the user device 101, which may execute other functions of the user device 101 that require a lower security standard. Such further hardware and/or software may also instruct the secure processing environment 103 to perform cryptographic processing of data forwarded to the secure processing environment 103 and to output the processing results.

In particular, the secure processing environment 103 provides a function for validating data upon request of other program modules and/or processes which may be executed in the secure processing environment 103 or another processing environment of the user device 101. In one particular exemplary embodiment, the secure processing environment 103 may include a loader module for securely loading program modules in the user device 101. The loader module only loads such program modules into a processor of the user device 101 (which may be a processor providing the secure processing environment 103 or a further processor of the user device 103) when images of the software programs are provided with a valid digital signature. In this embodiment, the digital signatures of the software images are preferably validated in the secure processing environment 103 using a root certificate and (if applicable) one or more intermediate digital certificates in a hierarchical tree structure of digital certificates. In one implementation, an asymmetric key pair is uniquely assigned to each certified program module, where the secret key is used for creating the digital signature of the program module and the public key is used in the user device 101 for verifying the digital signature. This public key may be included in a digital certificate provided in the user device 101, which is validated using a root certificate Ri (and possibly one or more intermediate digital certificate(s)). In order to ensure that only successfully validated software programs are loaded into the processor(s) of the user device 101, the user device 101 may be configured such that at least security related software programs can only be loaded upon a validation in the loader module.

Such a loader module may particularly be applied in user devices 101 configured as set top boxes or other CPEs for the validation procedure of the program modules of the system software and the client software modules of the content providers explained above.

The secure processing environment 103 has access to a number of root certificates Ri (i=1, . . . , N) stored in the user device 101. In FIGS. 1a and 1b, three root certificates R1, R2, R3 are shown by way of example. However, in further embodiments the user device 101 may include any number N of root certificates Ri which equals or is greater than two. The root certificates Ri are securely stored in the user device 101 in such a way that the secure processing environment 103 can validate the integrity of the root certificates 101 without relying to further certificates which are provided to the secure processing environment 103.

In embodiment shown in FIG. 1a, the root certificates Ri are stored in secure memory component 104 of the user 101. The secure memory component 104 is configured such that its content cannot be modified once it is stored in the memory component 104. Moreover, the memory component 104 is preferably embedded in or physically linked to the secure processing environment 103 in such a way that it is not possible to re-direct requests of the secure processing environment 103 for reading a root certificate Ri to another memory inside or outside the user device 101. The root certificates Ri may be stored in the memory component 104 by appropriately programming the memory component 104 during the process of manufacturing the user device 101 or in a secure provisioning process of the user device 101.

In one particular implementation of the embodiment shown in FIG. 1a, the memory component 104 may be configured as a one-time programmable (OTP) memory, which can only be programmed a single time. After programming, the data stored within the OTP memory cannot be modified or erased. However, it is possible to add further data to the OTP memory. This option may be applied by the secure processing environment 103 to add data to the OTP memory in some embodiments explained in more detail below. In an alternative implementation, the memory component 104 is configured as a read-only memory which can only be programmed once and which only allows to read data from the memory after having been programmed.

In an alternative embodiment shown in FIG. 1b, the root certificates Ri are stored in a re-programmable memory 106 of the user device 101. In this embodiment, the root certificates Ri are provided with validation data VD, which allow to verify the authenticity and integrity of the root certificates Ri in the secure processing environment 103 using a cryptographic verification key. The validation data VD may comprise a digital signature including digests of the root certificates Ri, which are encrypted such that they can only be decrypted using the verification key.

The verification key may be a public key of an asymmetric key pair and, in this case, the digests of the root certificates Ri are encrypted using the secret key of the key pair. The verification key may be stored in the user device 101 such that it cannot be replaced by another cryptographic key (e.g. a counterfeit key for "validating" a counterfeit root certificate). For this purpose, the verification key may be stored in an OTP memory or a read-only memory of the user device 101, which is securely linked to the secure processing environment 103. Compared with the aforementioned embodiment in which the root certificates Ri are stored in such a memory themselves, this embodiment has the advantage that a smaller OTP or read-only memory can be employed, because the verification key usually has a smaller data volume than the root certificates Ri.

As an alternative to a digital signature created using a secret key of an asymmetric key pair, it is also possible in the embodiment shown in FIG. 1b to create the digital signature of the validation data using a symmetric cryptographic key, which is also used for decrypting the digital signature. In this case, the symmetric key is stored within the user device 101, particularly within the secure processing environment 103, in such a way, that it cannot be read or modified by (unauthorized) third parties.

In order to verify the authenticity and the integrity of a root certificate Ri in the embodiment shown in FIG. 1b, the secure processing environment 103 decrypts the digest of the root certificate Ri included in the validation data VD using the verification key provided for this purpose. Moreover, the secure processing environment 103 calculates the digest of the root certificate Ri to be validated and compares the calculated digest with the decrypted digest. Only in case both digests correspond to each other, the root certificate Ri is validated successfully.

As the other digital certificates used in the user device 101, each root certificate Ri comprises a public key. This public key is part of an asymmetric key pair pertaining to the root certificate. The secret key is securely held and used in a trust authority server 105 that is connected to the user device 101 via a data network. The trust authority server 105 is operated by a trust authority that also manages the root certificates Ri or by an organization that provides revocation information for revoking root certificates Ri on behalf of the trust authority. The trust authority may use the secret key to create digital signatures and/or other encrypted data. In particular, the trust authority may act as a certification authority for issuing digital certificates that can be validated using the root certificates Ri (i.e. for issuing digital certificates including digital signatures which can be decrypted the public keys included in the root certificates). Thus, it is the trust authority which issues the digital certificates of the second level of a hierarchical tree structure of digital certificates, which contains a root certificate Ri as the root node.

In addition to the public key, the root certificates Ri may comprise management information which may include for each root certificate Ri an identification of the root certificate Ri and possibly further information, such as e.g. information identifying the trust authority.

Furthermore, a ranking order is established among the root certificates Ri stored in the user device 101, in which one root certificate Ri follows the other. Thus, if N root certificates R1, . . . , RN are stored in the user device 101, each root certificate is uniquely allocated to one of the ranks 1 to N. The rank of each root certificate Ri is preferably specified in the management information supplementing the public key in the root certificate Ri. For this purpose, the management information of a root certificate Ri may include a data field indicating the root certificate's rank and/or the rank may be specified in the identification of the root certificate included in the management information. By way of example, it is assumed in the following that the rank of a particular root certificate Ri is reflected in the name of the root certificate as used in this specification. Thus, it is assumed that the root certificate Ri has the rank i.

The ranking order among the root certificates Ri plays a role in the process of revoking a root certificate Ri. So, as will be explained in more detail below, it is in particular only possible to a revoke a root certificate Ri in one rank when the revocation information that is provided to the user device 101 for this purpose is digitally signed using a secret key pertaining to a root certificate Rj of a higher rank.

In one embodiment, the root certificates Ri may not be digitally signed. In this embodiment, each root certificate may only comprise the public key and the management information in an unencrypted form and does not comprise any (encrypted) credential for validating the public key and/or the management information. As an alternative, the root certificates Ri may be "self-signed". This means that each root certificate Ri contains a digital signature of the included public key and optionally of the management information, and this digital signature is created using the secret key pertaining to the root certificate Ri. Thus, the digital signature can be validated using the public key included in the root certificate. This provides a further security mechanism (in addition to the secure storage of the root certificates Ri in the user device 101) as the secure processing environment 103 may validate the digital signature of a root certificate Ri and may only use the root certificate, if the validation of the digital signature has been successful.

In a further embodiment, each root certificate Ri except the highest ranked root certificate RN is digitally signed using the secret key pertaining to the next root certificate R(i+1) in the ranking order. Thus, the root certificate Ri in the i-th rank includes a digital signature created using the secret key pertaining to the root certificate R(i+1) in the (i+1)-th rank. In this embodiment, the secure processing environment 103 may use the public key included in a root certificate Ri in rank i to validate the digital signature included in the root certificate R(i−1) in the preceding rank i−1. The highest-rank root certificate RN may not include a digital signature or may be self-signed again in this embodiment. In this embodiment, the rank of a digital signature is reflected in the digital signature included in the root certificate Ri as this digital signature can only be decrypt using the public key included in the root certificate in the following rank R(i−1). Therefore, it would not be necessary in this embodiment to include the rank of a root certificate in its management information (although it may be included therein).

The user device 101 supports a mechanism for revoking digital certificates including the root certificates Ri stored in the user device 101. This mechanism may be used when a secret key allocated to one of the digital certificates has become known to an authorized third party or if it is likely that this happened. The revocation of a digital certificate has the effect that this digital certificate can no longer be used for validating other digital certificates or further data in the user device 101.

Upon the revocation of a digital certificate, the entity to which the digital certificate is assigned may require a new digital certificate to be installed in the user device 101 so that the user device 101 can validate further digital certificates or other data which have been digitally signed by the entity after the revocation of the entity's digital certificate. This is particularly true for a root certificate Ri which forms the root node of a tree structure of digital certificates. Therefore, the revocation mechanism supported by the user device 101 does particularly allow for utilizing one or more of the remaining root certificates Ri stored in the user device 101 after one root certificate has been revoked.

According to this mechanism, a first root certificate Ri stored in the user device 101 may only be revoked using another root certificate Rj stored in the user device 101. As will be explained in more detail below, a first root certificate Ri may be revoked using a second root certificate R(i+1) in the next rank (i+1) following the rank i of the first root certificate Ri. Therefore, the first root certificate R1 having the rank 1 is preferably the first root certificate that is "active" after the root certificates Ri have been stored in the user device 101. In the period of time, in which the first root certificate R1 is "active", the trust authority issues digital certificates or other protected data which are digitally signed using the secret key pertaining to the first root certificate R1. If this secret key has become known to un-authorized third parties or if the trust authority fears that this may have happened, the trust authority may revoke the first root certificate R1 in a process described below and may activate the second root certificate R2 in the following rank 2. In the same way, the trust authority may revoke a root certificate Ri in the rank i and puts the root certificate R(i+1) in the subsequent rank i+1 into use, if the secret key pertaining to a root certificate Ri is compromised.

Secret keys pertaining to root certificates Ri, which are not yet used for encrypting data, are preferably stored in a secure vault so that it is not (or only with great difficulties) possible for third parties to read out these secret keys. When a secret key is "activated" by the trust authority and used for creating digital signatures or for encrypting other data, the likelihood increases that the secret key is revealed to third parties. Therefore, the trust authority does preferably only use one secret key at a time.

When a new root certificate Ri is "activated", the trust authority no longer issues digital signatures created using the secret key pertaining to the root certificate R(i−1) in the previous rank, but uses the secret key pertaining to the new root certificate Ri for creating digital signatures. Further, the trust authority preferably issues new digital certificates for replacing the digital certificates stored in the user device 101, which are validated using the revoked root certificate R(i−1). Such new digital certificates may then be provided to the user device 101 in a suitable way. In particular, the may be sent via the data network connecting the user device 101 and the trust authority server 105.

The previous root certificate R(i−1), the secret key of which is compromised, may be revoked as soon as the next root certificate Ri is put into use. However, it may not be possible to immediately provide to the user device 101 replacement certificates for the digital certificates included in the tree structure pertaining to the root certificate R(i−1). Therefore, it is preferred that the previous root certificate R(i−1) is only revoked after the expiration of a transitional time period which begins with the "activation" of the new root certificate Ri. During this transitional period, the user device 101 can validate new certificates issued by the trust authority using the new root certificate Ri, and it can still validate older digital certificates issued by the trust authority using the previous root certificate R(i−1).

The revocation mechanism for root certificates provides in one embodiment that a revocation message is transmitted form the trust authority server 105 to the user device 101 each time the trust authority wants to revoke a root certificate Ri. The trust authority server 105 may send the revocation message to the user device 101 on its own initiative, or the user device 101 may retrieve the revocation message from the trust authority server 105. In the latter case, the user device 101 may check on regular basis whether a new revocation message is available within the trust authority server 105. The revocation message preferably specifies the root certificate Ri to be revoked. Moreover, in order to revoke a root certificate Ri of the rank i, the revocation message is digitally signed using the secret key pertaining to a root certificate Rj having a rank j that is higher than the rank i of the root certificate Ri to be revoked. Preferably, the revocation message is digitally signed using the secret key pertaining to the root certificate R(i+1) in the next rank. However, it is likewise possible to use the secret key pertaining to another root certificate Rj having a higher rank than the root certificate Ri to be revoked. An indication of the root certificate Rj to which the secret belongs, which has been used for digitally signing the revocation message, is preferably also included in the revocation message.

When the user device 101 receives the revocation message it is forwarded to the secure processing environment 103, and the secure processing environment 103 executes a validation procedure for the revocation message.

In one step of this validation procedure, the secure processing environment 103 validates the digital signature included in the revocation message using the public key included in the root certificate Rj. For this purpose, the secure processing environment 103 decrypts the digital signature of the revocation message using the public key included in the root certificate Rj and reads the digest of the revocation message included in the digital signature. Moreover, it calculates the digest of the revocation message on its own and compares it with the decrypted digest. Only if both digests correspond to each other, the secure processing environment 103 determines that the digital signature is valid.

In a further step of the validation procedure for the revocation message, the secure processing environment 103 checks whether the revoked root certificate Ri specified in the revocation message has a rank that is lower than the rank of the digital certificate Rj used for validating the digital signature. Only if this check is affirmative, the secure processing environment 103 determines that the revocation message is valid. Otherwise, the secure processing environment 103 regards the revocation message as being invalid and does not revoke the root certificate Ri specified therein.

This validation procedure ensures that a comprised secret key pertaining to a root certificate Ri cannot be used to create (particularly to digitally sign) a revocation message for revoking root certificates Ri having a higher rank. Thus, if a secret key pertaining to a root certificate is uncovered, it is particularly not possible to use this secret key to revoke all root certificates Ri stored in the user device 101, thereby preventing the user device 101 from being further used.

After having successfully validated the revocation message in the validation procedure described above, the secure processing environment 103 regards the root certificate Ri specified in the revocation message as revoked and does no longer use this root certificate Ri for validating digital signatures or for decrypting or encrypting further data.

In order to ensure that the revoked root certificate Ri is no longer used, the secure processing environment 103 may securely store in the user device 101 an indication that the root certificate Ri is revoked. The indication is stored in the user device 103 in response to the successful validation of the revocation message. This indication may particularly be stored in an OTP memory of the user device 101. Thus, if the root certificates Ri are stored in an OTP memory as explained above, the secure processing environment 103 may mark a revoked root certificate Ri correspondingly. As an alternative, the secure processing environment 103 may store revocation indications for the root certificates Ri in another OTP memory which is provided in the user device 101 for this purpose. This may particularly be done if the root certificates Ri themselves are not stored in an OTP memory.

In this embodiment, the secure processing environment 103 reads the content of the OTP memory indicating the revoked root certificate(s) each time a particular root certificate Ri is to be used in order to validate a digital signature or for other purposes. This may e.g. be the case when the secure processing environment has to validate a digital certificate which has been signed using a secret pertaining to a root certificate Ri. Then, the secure processing environment 103 checks whether the OTP memory includes an indication that the root certificate Ri is revoked. If the secure processing environment 103 determines that such an indication exists in the OTP memory for the root certificate Ri, it does not use the root certificate Ri and may terminate the process which requires the utilization of the root certificate Ri. Only, if the secure processing environment determines that the OTP memory does not include an indication that the root certificate Ri is revoked it uses the root certificate Ri.

This validation mechanism may be securely implemented in the secure processing environment 103 in such a way that is not possible to use a root certificate Ri without a prior determination that the OTP memory does not include an indication that the root certificate Ri is revoked. Hereby, it is ensure that the secure processing environment 103 does no longer use a root certificate Ri after is has been revoked in response to a valid revocation message received in the user device 101.

In a further embodiment, the trust authority server 105 provides a revocation list which specifies all root certificates Ri which have been revoked at the point of time the revocation list is issued. Thus, a new version of the revocation list is provided each time the trust authority revokes a (further) root certificate Ri. In order to distinguish different versions of the revocation list, the revocation list may particularly be provided with a version number or similar information. Such information may e.g. include a time stamp indicating the time of the generation or issuance of a version of the revocation list. The revocation list specifies the revoked root certificates Ri using their identifications and it is digitally signed using a secret key pertaining to a root certificate Rj which has a higher rank than all of the revoked root certificates Ri specified in the revocation list. Preferably, the revoked root certificates Ri have consecutive ranks and the revocation list is digitally signed using the secret key pertaining to the root certificate in the next rank following the highest rank of the root revoked root certificates Ri. However, other configurations are possible which meet the requirement that the digital signature of the revocation list is created using a secret key pertaining to a root certificate Rj which has a rank that is higher than the highest rank of the revoked certificates Ri.

In this embodiment, the secure processing environment 103 accesses the revocation list each time data including digital signatures are to be decrypted or data are to be encrypted using a particular root certificate Ri. For this purpose, the secure processing environment 103 may retrieve the revocation list from the trust authority server 105, when a root certificate Ri is to be used for validating data. In an alternative implementation, the secure processing environment 103 may store the revocation list after it is has been transmitted to the user device 101. This may done on the initiative of the trust authority (e.g. each time a new or updated revocation list is issued), or the secure processing environment 103 may retrieve from the trust authority server 104 updated versions of the revocation list on a regular basis and/or upon commands. Such commands may be entered by the user of the user device 101 and/or issued by program modules executed in the user device 101. In the process of retrieving updated versions of the revocation list, the secure processing environment 103 may check within the scope of a corresponding communication with the trust authority server 105, whether the trust authority issued a version of the revocation list which is newer than the version stored in the secure processing environment 103. If the secure processing environment 103 determines that this is the case, the current (updated) revocation list may be downloaded to the user device 101 and stored in the secure processing environment 103. In the secure processing environment 103, the new version of the revocation list preferably replaces the older version, which may be deleted.

When the secure processing environment 103 accesses the revocation list stored in the user device 102 or retrieves the revocation list from the trust authority server 105 upon a command to use a particular root certificate Ri for the decryption or encryption of data, it checks whether the accessed revocation list is valid and, if the revocation is valid, it determines whether the root certificate Ri is indicated as revoked in the revocation list. If this is the case, the secure processing environment 103 does not use the root certificate Ri and, thus, does not decrypt or encrypt the data. Rather it may provide a corresponding failure indication as response to the command to decrypt or encrypt the data. On the other hand, the secure processing environment 103 decrypts or encrypts the data, if it is determined that the root certificate Ri is not indicated in the revocation list as being revoked. In this case, it provides the result of the decryption or encryption process as a response to the command.

The procedure for validating the revocation list is similar to the process for validating the revocation message described above. Thus, using one of the root certificates Rj the secure processing environment 103 validates the digital signature included in the revocation list as explained in connection with the revocation message. Moreover, it reads the one or more revoked root certificate(s) specified in the revocation list. Then, it checks whether the rank of the root certificate Rj used for validating the digital signature is higher than the highest rank of the revoked certificates Ri. If this check is affirmative, the secure processing environment 103 does not use the revoked root certificate(s) Ri for validating digital signatures or for other purposes. If the check leads to a negative result, the secure processing environment 103 regards the revocation list as not being valid and may ignore the revocation list or may execute a predetermined failure routine. Such failure routine may e.g. include an indication to the user of the user device 101 and/or to the trust authority server 105 that an invalid revocation list has been provided to the user device 101.

Thus, in this embodiment, the configuration of the secure processing environment 103 to access and validate the revocation list each time a root certificate Ri is to be used ensures that revoked root certificates Ri are no longer used in the user device 101 without having to securely store an additional indication for the revoked root certificates Ri.

However, it may not be possible to guarantee that the secure processing environment 103 uses the latest version of the revocation list so that the secure processing environment 103 may regard a root certificate Ri as being valid on the basis of the revocation list available in the user device 101 although this root certificate Ri has been revoked in a newer version of the revocation list. Such a situation may particularly occur in embodiments in which the secure processing environment 103 does not retrieve the revocation list from the trust authority server 105 each time a root certificate Ri is to be used, but retrieves the revocation list on a regular basis or upon corresponding requests by the user and/or programs executed in the user device 101. Moreover, such a situation may occur, if the revocation list available in the user device 101 has been compromised or replaced by a previous version of the revocation list, or if the transmission of the current version of the revocation list to the user device 101 is blocked by an attacker.

In order to prevent that the use of an outdated revocation list affects the security of program modules executed in the user device 101, the secure processing environment 103 preferably provides for program modules installed in the user device 101 information about the revocation list which it uses when it validates data. So, a program module which does e.g. rely on the validation of a digital signature verified in the secure processing environment 103 may read the information as to the version of the revocation list accessed for checking that the root certificate Ri that has been used for verifying the digital signature (directly or via intermediate certificates) is not revoked. Using this information, the program module may check whether the latest revocation list is used and/or whether an acceptable previous version of the revocation list has been used. Thus, the program module checks whether the used version of the revocation list is higher than a minimum version specified in the program module. (Only) in this case, it may rely on the validation of the digital signature in the secure processing environment 103. If the used version of the revocation list is not considered to be appropriate, an error routine may be executed. According to this error routine, the execution of the program module may be stopped or paused. Moreover, the program module may request the secure processing environment 103 to retrieve the current revocation list from the trust authority server 105 or provide at the user interface coupled to the user device 101 an indication to the user that the current version of the revocation list should be retrieved from the trust authority server 105. After the current revocation list has been downloaded to the user device 101 upon such request of the program module or under the control of the user, the program module may be started again or the execution of the program module may be continued.

If the user device 101 includes a loader module for validating images of software programs which are loaded into a processor of the user device 101, the revocation list used for verifying the digital signatures of the loaded software images may be used by a program module in order to verify that the user device 101 provides a secure software configuration for executing the program module. In particular, it may be checked whether other modules loaded and executed in the user device 101 have been validated on the basis of the current revocation list or an acceptable previous version of the revocation list. In one embodiment, this check is made in the loader module mentioned above, and for carrying out the check, the program module may provide to the loader module an indication of the minimum version of the revocation list, which is considered to be appropriate for the program module. As an alternative, the check may be executed in the program module. In this implementation, the loader module provides to the program module an indication of the version of the revocation list which has been used in order to validate the root certificate Ri that has been applied to verify the digital signatures of the other program modules executed in the user device 101. In both alternatives, the version indication is securely transmitted to the intended receiver so that it cannot be modified during the transmission. Only in case the check of the version of the revocation list leads to the result, that the version of the used revocation list is higher than the minimum version, the program module may continue or start its operation. Otherwise, the program module may not start or stop its operation. In this case, it may also provide at the user interface of the user device 101 an indication that the current revocation list should be downloaded in order to properly execute the program module in the user device 101. Preferably, the program module does also not start or stop its operation, if the check of the version of the revocation list cannot be carried out in the user device 101 within a predetermined period of time which may begin with the initialization of the program module. Hereby, it is particularly prevented that the program module is executed on a device with inappropriate software, when an attacker blocks the check of the version of the revocation list in the user device 101.

This embodiment may particularly be implemented in a user device 101 which is configured as a CPE for decrypting protected content of a content provider and for providing the decrypted content for a playback. In such a user device 101, minimum versions of the revocation lists may particularly be specified for client software modules assigned to specific content providers. Here, each content provider may specify a minimum version of the revocation list, which he considers to be appropriate. This minimum version may be stored in the provider's client software module or in association with this client software module. When the provider's client software module is initiated, the aforementioned check of the version of the revocation list may be executed. If this check leads to the result that an inappropriate version of the revocation list has been used, it is prevented that the user device 101 decrypts content of the content provider to which the client software module is assigned. For this purpose, the provider's client software module may control the system software of the user device 101 to suspend decryption of the content of the provider and/or the client software module may block the forwarding of the control word for decrypting the provider's content to the system software, so that it is not possible for the system software to decrypt the provider's content. Moreover, it is preferably prevented in such a way that the user device 101 decrypts the provider's content, if the aforementioned check of the version of the revocation list cannot be executed. Hereby, it is particularly prevented that a user device 101 having inappropriate software can be used for decrypting content of the provider, if an attacker blocks the check of the version of the revocation list in the user device 101.

When a root certificate Ri stored in the user device 101 is revoked in accordance with one of the embodiments explained above, the digital certificates included in the tree structure of digital certificates pertaining to the root certificate Ri also become invalid as they can no longer be validated using the revoked root certificate Ri. For this purpose, replacement certificates have to be provided for these digital certificates as already mentioned above and as further illustrated in FIGS. 2a and 2b.

Figure 2A:
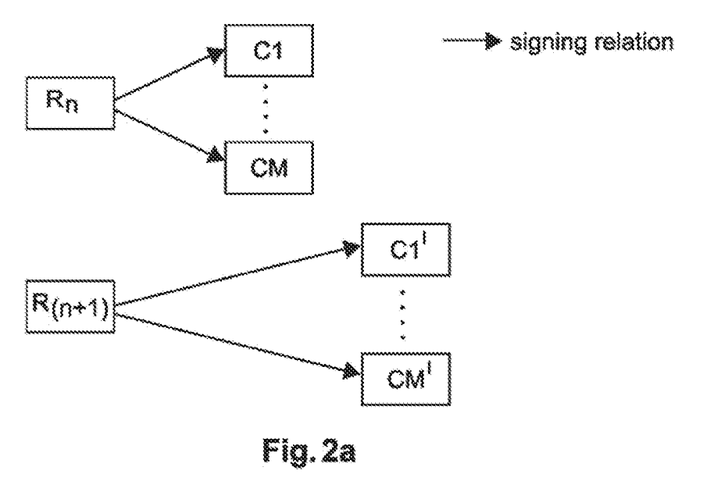
FIG. 2a is a schematic illustration of root certificates and further digital certificates.

FIG. 2a shows two root certificates Rn and R(n+1) stored in the user device 101. Moreover, the user device 101 disposes of M digital certificates C1, ..., CM, which can be validated using the root certificate Rn. When the secret key pertaining to the root certificate Rn is compromised, the trust authority puts the root certificate R(n+1) into use in the example illustrated in FIGS. 2a and 2b. This means that the trust authority does now use the secret key pertaining to the root certificate R(n+1) for generating digital certificates. In so doing, the trust authority may also generate replacement digital certificates C1', ..., CM' for replacing the digital certificates C1, ..., CM. Thus, new digital certificates C1', ..., CM' are provided for the entities to which the digital certificates C1, ..., CM belong.

As explained above, the root certificate Rn may not be revoked until the expiration of transitional period beginning with the "activation" of the root certification R(n+1). During this transitional period, the user device 101 can still (successfully) validate the digital certificates C1, ..., CM using the root certificate Rn, and the user device 101 can also successfully validate the new digital certificates C1', ..., CM' as illustrated in FIG. 2a.

When the transitional period has expired, the trust authority may revoke the root certificate Rn. For this purpose, it provides revocation information 201 to the user device 101, which may include a revocation message or a revocation list as explained above. The revocation information 201 specifies that the root certificate Rn is to be revoked and is digitally signed using the key pertaining to the root certificate R(n+1). When the revocation information 201 is received in the user device 101, it is validated in the secure processing environment 103 as explained above. Thus, the processing environment 103 validates the revocation information 201 using the root certificate R(n+1) and checks whether the root certificate R(n+1) as a higher rank than the root certificate Rn to be revoked.

Figure 2B:
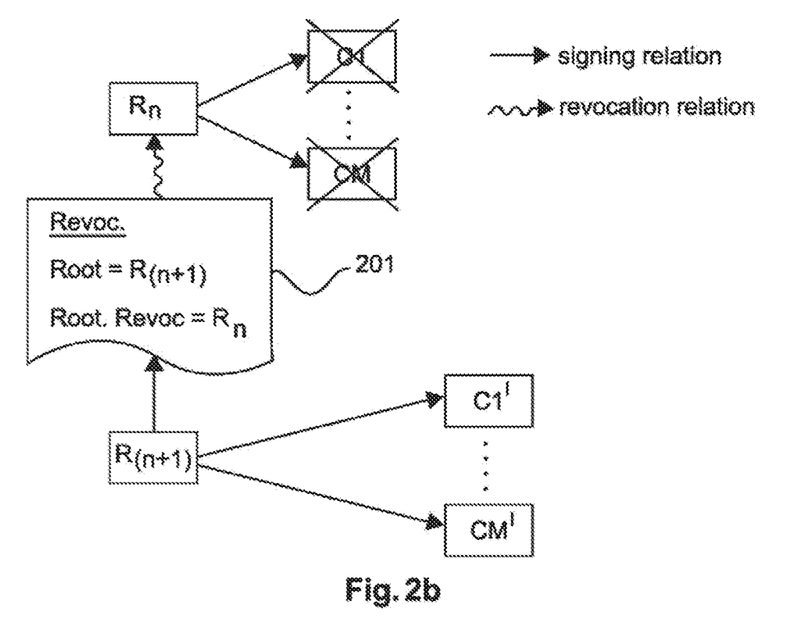
FIG. 2b is a schematic illustration of the root certificates and the further digital certificates when one of the root certificates is revoked.

If the validation of the digital signature of the revocation information 201 and the check are successful, the secure processing environment 103 does no longer use the root certificate Rn for validating data. In particular, this means that the digital certificates C1, ..., CM become invalid as the root certificate Rn is blocked from being used for validating these certificates. This is illustrated in FIG. 2b.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measures cannot be used to advantage.

The invention claimed is:

1. The device for validating data using a root certificate, wherein a plurality of root certificates is stored in the device, each root certificate having a rank, and wherein the device is configured to receive revocation information indicating at least one revoked root certificate, to validate the revocation information using one of the root certificates stored in the device and to block the use of the revoked root certificate if the revocation information is successfully validated using a root certificate having a higher rank than the revoked root certificate, wherein the device is adapted to receive different versions of the revocation information, each version of the revocation information indicating all root certificates that have been revoked until the issuance of the version, wherein a minimum version of the revocation information is allocated to at least one program application included in the device, and wherein the device is configured to execute an error routine, if it is not verified that the applied version of the revocation information is equal to or greater than the minimum version, and wherein the minimum version of the revocation information is specified by a content provider.

2. The device according to claim 1, wherein the revocation information includes a digital signature and wherein the validation of the revocation information comprises validating the digital signature.

3. The device according to claim 1, wherein the device is adapted to securely store a revocation indication for the root certificate specified in the revocation information in response to a successful validation of the revocation information.

4. The device according to claim 2, wherein the device is adapted to securely store a revocation indication for the root certificate specified in the revocation information in response to a successful validation of the revocation information.

5. The device according claim 3, wherein the device is configured to check whether a revocation indication for a root certificate is stored in the device when data is to be validated using the root certificate and to validate the data using the root certificate only, if no revocation indication for the root certificate is stored in the device.

6. The device according claim 4, wherein the device is configured to check whether a revocation indication for a root certificate is stored in the device when data is to be validated using the root certificate and to validate the data using the root certificate only, if no revocation indication for the root certificate is stored in the device.

7. The device according to claim 3, wherein the device comprises a one-time programmable memory for storing the revocation indication.

8. The device according to claim 4, wherein the device comprises a one-time programmable memory for storing the revocation indication.

9. The device according to claim 5, wherein the device comprises a one-time programmable memory for storing the revocation indication.

10. The device according to claim 6, wherein the device comprises a one-time programmable memory for storing the revocation indication.

11. The device according to claim 1, wherein user device is configured to access and validate the revocation information each time a root certificate is to be used in the device in order to validate data.

12. The device according to claim 11, wherein the device is configured to store the revocation information upon receipt thereof and to apply the stored revocation information each time a root certificate is to be used in order to validate data.

13. The device according to claim 11, wherein the user device is configured to access the revocation information by retrieving the revocation information from a trust authority server connected to the user device.

14. The device according to claim 12, wherein the user device is configured to access the revocation information by retrieving the revocation information from a trust authority server connected to the user device.

15. The device according to claim 12, wherein the trust authority server provides a new version of the revocation information each time a root certificate is revoked, each version of the revocation information indicating all root certificates that have been revoked until the issuance of the version, and wherein the device is configured to receive a new version of the revocation information upon issuance thereof.

16. The device according to claim 13, wherein the trust authority server provides a new version of the revocation information each time a root certificate is revoked, each version of the revocation information indicating all root certificates that have been revoked until the issuance of the version, and wherein the device is configured to receive a new version of the revocation information upon issuance thereof.

17. The device according to claim 14, wherein the trust authority server provides a new version of the revocation information each time a root certificate is revoked, each version of the revocation information indicating all root certificates that have been revoked until the issuance of the version, and wherein the device is configured to receive a new version of the revocation information upon issuance thereof.

18. The P-device according to 15, wherein a minimum version of the revocation information is allocated to at least one program application included in the device, and wherein the device is configured to execute an error routine, if it is not verified that the applied version of the revocation list is equal to or greater than the minimum version.

19. The device according to 16, wherein a minimum version of the revocation information is allocated to at least one program application included in the device, and wherein the device is configured to execute an error routine, if it is not verified that the applied version of the revocation list is equal to or greater than the minimum version.

20. The device according to 17, wherein a minimum version of the revocation information is allocated to at least one program application included in the device, and wherein the device is configured to execute an error routine, if it is not verified that the applied version of the revocation list is equal to or greater than the minimum version.

21. The device according to claim 1, wherein the root certificates are stored in the device in such a way that they cannot be modified.

22. The device according to claim 1, comprising a secure processing environment for validating data using the root certificates stored in the device and for validating the revocation information.

23. The device including a device according to claim 1 and further comprising a trust authority server connected to the device, the trust authority server being adapted to transmit the revocation information to the device.

24. A method for revoking a root certificate stored in a device, wherein a plurality of root certificates is stored in the device, each root certificate having a rank, and wherein the method comprises the steps of: receiving in the device revocation information indicating at least one revoked root certificate, validating the revocation information using one of the root certificates stored in the device, blocking the use of the revoked root certificate if the revocation information is successfully validated using a root certificate having a higher rank than the revoked certificate specified in the revocation information,     wherein validating the revocation information includes:

allocating a minimum version of the revocation information to at least one program application included in the device, the minimum version of the revocation information is specified by a content provider,         determining whether the applied version of the revocation information is equal to or greater than the minimum version, and         executing an error routine if the applied version is not equal to or greater than the minimum version, and     wherein receiving the revocation information by the device includes receiving different versions of the revocation information, each version of the revocation information indicating all root certificates that have been revoked until the issuance of the version.

25. A non-transitory computer-readable medium containing therein computer executable instructions that, when executed by a computer processor, cause the computer processor to perform a method for revoking a root certificate stored in a device, wherein a plurality of root certificates is stored in the device, each root certificate having a rank, and wherein the method comprises the steps of: receiving in the device revocation information indicating at least one revoked root certificate, validating the revocation information using one of the root certificates stored in the device, and blocking the use of the revoked root certificate if the revocation information is successfully validated using a root certificate having a higher rank than the revoked certificate specified in the revocation information,     wherein validating the revocation information includes:

allocating a minimum version of the revocation information to at least one program application included in the device, the minimum version of the revocation information is specified by a content provider,         determining whether the applied version of the revocation information is equal to or greater than the minimum version, and         executing an error routine if the applied version is not equal to or greater than the minimum version, and     wherein receiving the revocation information by the device includes receiving different versions of the revocation information, each version of the revocation information indicating all root certificates that have been revoked until the issuance of the version.

\* \* \* \* \*

UNITED STATES PATENT AND TRADEMARK OFFICE
CERTIFICATE OF CORRECTION

PATENT NO. : 9,729,333 B2  
APPLICATION NO. : 14/735569  
DATED : August 8, 2017  
INVENTOR(S) : Marnix Vlot and Christoph Schaaf Page 1 of 1

It is certified that error appears in the above-identified patent and that said Letters Patent is hereby corrected as shown below:

On the Title Page

In Abstract, Line 2: "... wherein a plurality of root certificates is ..." should read: "... wherein a plurality of root certificates are ..."

In the Claims

Column 16, Line 66: "... wherein a plurality of root certificates is ..." should read: "... wherein a plurality of root certificates are ..."

Column 18, Line 33: "The P-device according to 15, ..." should read: "The device according to claim 15, ..."

Column 18, Line 39: "The device according to 16, ..." should read: "The device according to claim 16, ..."

Column 18, Line 45: "The device according to 17, ..." should read: "The device according to claim 17, ..."

Column 18, Line 63: "... wherein a plurality of root certificates is stored in ..." should read: "... wherein a plurality of root certificates are stored in ..."

Column 19, Line 25: "... wherein a plurality of root certificates is ..." should read: "... wherein a plurality of root certificates are ..."

Signed and Sealed this  
Seventh Day of November, 2017

Joseph Matal  
*Performing the Functions and Duties of the*  
*Under Secretary of Commerce for Intellectual Property and*  
*Director of the United States Patent and Trademark Office*